United States Patent
Schwartz

(10) Patent No.: US 9,614,932 B2
(45) Date of Patent: Apr. 4, 2017

(54) MANAGING AND IMPLEMENTING WEB APPLICATION DATA SNAPSHOTS

(71) Applicant: Microsoft Technology Licensing, LLC, Redmond, WA (US)

(72) Inventor: David Schwartz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 365 days.

(21) Appl. No.: 13/890,955

(22) Filed: May 9, 2013

(65) Prior Publication Data

US 2014/0280495 A1 Sep. 18, 2014

Related U.S. Application Data

(60) Provisional application No. 61/783,513, filed on Mar. 14, 2013.

(51) Int. Cl.
| | | |
|---|---|---|
| *G06F 15/16* | (2006.01) | |
| *H04L 29/06* | (2006.01) | |
| *G06F 9/48* | (2006.01) | |
| *G06F 17/30* | (2006.01) | |
| *G06Q 10/10* | (2012.01) | |

(52) U.S. Cl.
CPC .............. *H04L 67/42* (2013.01); *G06F 9/485* (2013.01); *G06F 17/30902* (2013.01); *G06Q 10/107* (2013.01)

(58) Field of Classification Search
CPC .................. G06F 17/30902; G06Q 10/107
USPC .................................. 709/203, 206, 220–222
See application file for complete search history.

(56) References Cited

U.S. PATENT DOCUMENTS

| | | | |
|---|---|---|---|
| 5,675,791 A | 10/1997 | Bhide et al. | |
| 5,737,601 A | 4/1998 | Jain et al. | |
| 5,974,238 A | 10/1999 | Chase, Jr. | |
| 6,226,650 B1 | 5/2001 | Mahajan et al. | |
| 6,549,917 B1 | 4/2003 | Pollard et al. | |

(Continued)

FOREIGN PATENT DOCUMENTS

EP     1693771     8/2006

OTHER PUBLICATIONS

"International Search Report & Written Opinion for PCT Patent Application No. PCT/US2014/025210", Mailed Date: Jul. 3, 2014, Filed Date: Mar. 13, 2014, 9 Pages.

(Continued)

*Primary Examiner* — Wing F Chan
*Assistant Examiner* — Joseph Maniwang
(74) *Attorney, Agent, or Firm* — Workman Nydegger

(57) ABSTRACT

Embodiments are directed to locally storing a snapshot of a personal information management web application, efficiently booting a personal information management web application and to managing personal information management web application snapshots. In one scenario, a client computer system determines that various portions of stored content for a personal information management web application have been changed. The client computer system creates a snapshot of certain, specified portions of data that are used for booting the personal information management web application and stores the created snapshot in local storage on the client computer system. As such, the snapshot is available for the next personal information management web application boot-up.

19 Claims, 5 Drawing Sheets

(56) References Cited

U.S. PATENT DOCUMENTS

| | | |
|---|---|---|
| 6,578,054 B1 | 6/2003 | Hopmann |
| 6,643,669 B1 | 11/2003 | Novak et al. |
| 6,654,746 B1 | 11/2003 | Wong et al. |
| 6,671,757 B1 | 12/2003 | Multer et al. |
| 6,694,336 B1 | 2/2004 | Multer et al. |
| 6,769,048 B2 | 7/2004 | Goldberg et al. |
| 6,839,744 B1 | 1/2005 | Kloba et al. |
| 6,915,312 B2 | 7/2005 | Bodnar et al. |
| 6,947,967 B2 | 9/2005 | Ferris et al. |
| 6,976,077 B1 | 12/2005 | Lehew et al. |
| 7,013,316 B1 | 3/2006 | Hansen et al. |
| 7,035,847 B2 | 4/2006 | Brown et al. |
| 7,058,718 B2 | 6/2006 | Fontes et al. |
| 7,716,205 B1 | 5/2010 | Agapiev |
| 7,720,890 B2 | 5/2010 | Rao et al. |
| 7,743,019 B2 | 6/2010 | Shah et al. |
| 7,792,790 B2 | 9/2010 | Kim |
| 7,853,961 B2 | 12/2010 | Nori et al. |
| 7,890,798 B1 | 2/2011 | Priddy |
| 7,899,917 B2 | 3/2011 | Chitre et al. |
| 8,037,110 B2 | 10/2011 | Salgado et al. |
| 8,156,080 B2 | 4/2012 | Beck |
| 8,370,442 B2 | 2/2013 | Ahn et al. |
| 8,429,247 B1* | 4/2013 | Nordman et al. ............ 709/218 |
| 2002/0078075 A1 | 6/2002 | Colson et al. |
| 2003/0066065 A1* | 4/2003 | Larkin ................... G06F 8/65 717/177 |
| 2003/0158947 A1 | 8/2003 | Bloch et al. |
| 2003/0233404 A1 | 12/2003 | Hopkins |
| 2004/0064570 A1 | 4/2004 | Tock |
| 2004/0073560 A1 | 4/2004 | Edwards |
| 2005/0027755 A1 | 2/2005 | Shah et al. |
| 2005/0076087 A1* | 4/2005 | Budd ................ G06Q 10/107 709/206 |
| 2005/0108251 A1 | 5/2005 | Hunt et al. |
| 2005/0114431 A1 | 5/2005 | Singh et al. |
| 2005/0154872 A1 | 7/2005 | McGrew et al. |
| 2005/0216639 A1 | 9/2005 | Sparer et al. |
| 2005/0228812 A1 | 10/2005 | Hansmann et al. |
| 2005/0243020 A1 | 11/2005 | Steeb |
| 2006/0015619 A1 | 1/2006 | Tse et al. |
| 2006/0031264 A1 | 2/2006 | Bosworth et al. |
| 2006/0074996 A1 | 4/2006 | Corbett et al. |
| 2006/0106879 A1 | 5/2006 | Zondervan et al. |
| 2006/0112150 A1 | 5/2006 | Brown et al. |
| 2006/0117073 A1 | 6/2006 | Bosworth et al. |
| 2006/0136517 A1 | 6/2006 | Creamer et al. |
| 2006/0167975 A1 | 7/2006 | Chan et al. |
| 2006/0173959 A1 | 8/2006 | McKelvie et al. |
| 2006/0190506 A1 | 8/2006 | Rao et al. |
| 2006/0200570 A1 | 9/2006 | Stirbu et al. |
| 2006/0206583 A1 | 9/2006 | Hill |
| 2007/0016695 A1 | 1/2007 | Rabbers et al. |
| 2007/0276836 A1 | 11/2007 | Chatterjee et al. |
| 2007/0288548 A1 | 12/2007 | Creamer et al. |
| 2008/0162728 A1 | 7/2008 | Robeal et al. |
| 2008/0168184 A1 | 7/2008 | Freedman et al. |
| 2008/0189439 A1 | 8/2008 | Chitre et al. |
| 2009/0216815 A1 | 8/2009 | Braginsky et al. |
| 2010/0257229 A1* | 10/2010 | Bolohan et al. ............ 709/203 |
| 2010/0257230 A1* | 10/2010 | Kroeger et al. ............ 709/203 |
| 2012/0042028 A1* | 2/2012 | Langoulant et al. ........ 709/206 |
| 2012/0254352 A1 | 10/2012 | Ito et al. |
| 2013/0066832 A1 | 3/2013 | Sheehan et al. |
| 2013/0159389 A1* | 6/2013 | Mahood et al. ............ 709/203 |

OTHER PUBLICATIONS

"Zimbra Desktop", Published on: Oct. 20, 2010, Available at: http://www.zimbra.com/products/desktop.html.

International Preliminary Report on Patentability Issued in PCT Patent Application No. PCT/US2014/025210, Mailed Date: Jul. 24, 2015, 7 Pages.

Munson, et al., "Sync: A system for mobile collaborative applications", IEEE Computer, 30(6): 59-66, Jun. 1997. Available at <<ftp://ftp.cs.unc.edu/pub/users/dewan/papers/sync.ps>>.

Kistler, et al., "Disconnected Operation in the Coda File System", ACM Transactions on Computer Systems, 10(1), Feb. 1992. Available at <<http://www.cs.cmu.edu/afs/cs/project/coda-www/Research WebPages/docdir/s13.pdf>>.

Seshadri, et al., "SQL Server for Windows CE—A Database Engine for Mobile and Embedded Platforms", International Conference on Data Engineering (ICDE), Feb./Mar. 2000. Available at <<http://ieeexplore.ieee.org/iel5/6778/18144/00839481.pdf?isN8mber=>>.

Shieh, et al., "Trickles: A Stateless network Stack for Improved Scalability, Resilience, and Flexibility", Proceedings of the 2nd USENIX Symposium on Networked Systems Design and Implementation (NSDI '05), Boston, MA, USA, May 2005. Available at <<http://www.usenix.org/events/nsdi05/tech/full_papers/shieh/shieh/html/>>.

G. Cao, "A Scalable Low-Latency Cache Invalidation Strategy for Mobile Environments", IEEE Transactions on Knowledge and Data Engineering, vol. 15, No. 5, Sep./Oct. 2003 (A preliminary version appeared in ACM MobiCom'00). Available at <<http://portal.acm.org/citation.cfm?coll=GUIDE&dl=GUIDE&id=345945>>.

International Search Report and Written Opinion for PCT Application Serial No. PCT/US2008/052697, mailed Jul. 14, 2008, 11 pages.

Jonsson, A., et al., "SyncML-Getting the Mobile Internet in Sync", Ericsson Review L M Ericsson Sweden, vol. 78, No. 3; 2001, pp. 110-115.

Lee, et al., "A Software Library for SyncML Server Applications", International Conference on Software Engineering Research and Practice—Serp 2003, vol. 2, Jun. 2003, pp. 533-537.

U.S. Appl. No. 11/670,369, Jul. 20, 2009, Office Action.
U.S. Appl. No. 11/670,369, Nov. 27, 2009, Office Action.
U.S. Appl. No. 11/670,369, Sep. 15, 2010, Office Action.
U.S. Appl. No. 11/670,369, Dec. 23, 2010, Notice of Allowance.

Second Written Opinion Issued in PCT Patent Application No. PCT/US2014/025210, Mailed Date: Jun. 24, 2015, 6 Pages.

* cited by examiner

MANAGING AND IMPLEMENTING WEB APPLICATION DATA SNAPSHOTS

CROSS-REFERENCE TO RELATED APPLICATIONS

This application claims priority to and the benefit of U.S. Provisional Application Ser. No. 61/783,513, filed on Mar. 14, 2013, entitled "Managing and Implementing Web Application Data Snapshots", which application is incorporated by reference herein in its entirety.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, email programs may be designed for use within a browser. These applications allow users to log in and access their email from any location that has internet access. These web applications maintain synchronicity with the application server while the user is logged in. However, some web applications provide an offline mode that allows the user at least some of the same features that were available online when the user is in an area with no connectivity. When the web application is again used online, various changes may have occurred on the application server. Reconciling these changes may be problematic.

BRIEF SUMMARY

Embodiments described herein are directed to locally storing a snapshot of a personal information management web application, efficiently booting a personal information management web application and to managing personal information management web application snapshots. In one embodiment, a client computer system determines that various portions of stored content for a personal information management web application have been changed. The client computer system creates a snapshot of certain, specified portions of data that are used for booting the personal information management web application and stores the created snapshot in local storage on the client computer system. As such, the snapshot is available for the next personal information management web application boot-up.

In another embodiment, a computer system determines that a snapshot was previously created for a personal information management web application, and is being stored in a local data store. The snapshot further includes various specified portions of data that are used for booting the personal information management web application. The computer system receives an indication that the personal information management web application is to be booted and accesses the snapshot for the personal information management web application stored in the local data store. The computer system then boots the personal information management web application using the accessed snapshot.

In yet another embodiment, a computer system determines that an event has occurred, where the occurrence of the event renders at least one existing personal information management web application snapshot invalid. The computer system determining that the invalid snapshot is not to be used during the next booting of the personal information management web application. The computer system then receives an indication that the personal information management web application is to be initiated and accesses web storage data to boot the personal information management web application in lieu of using the snapshot to boot the personal information management web application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
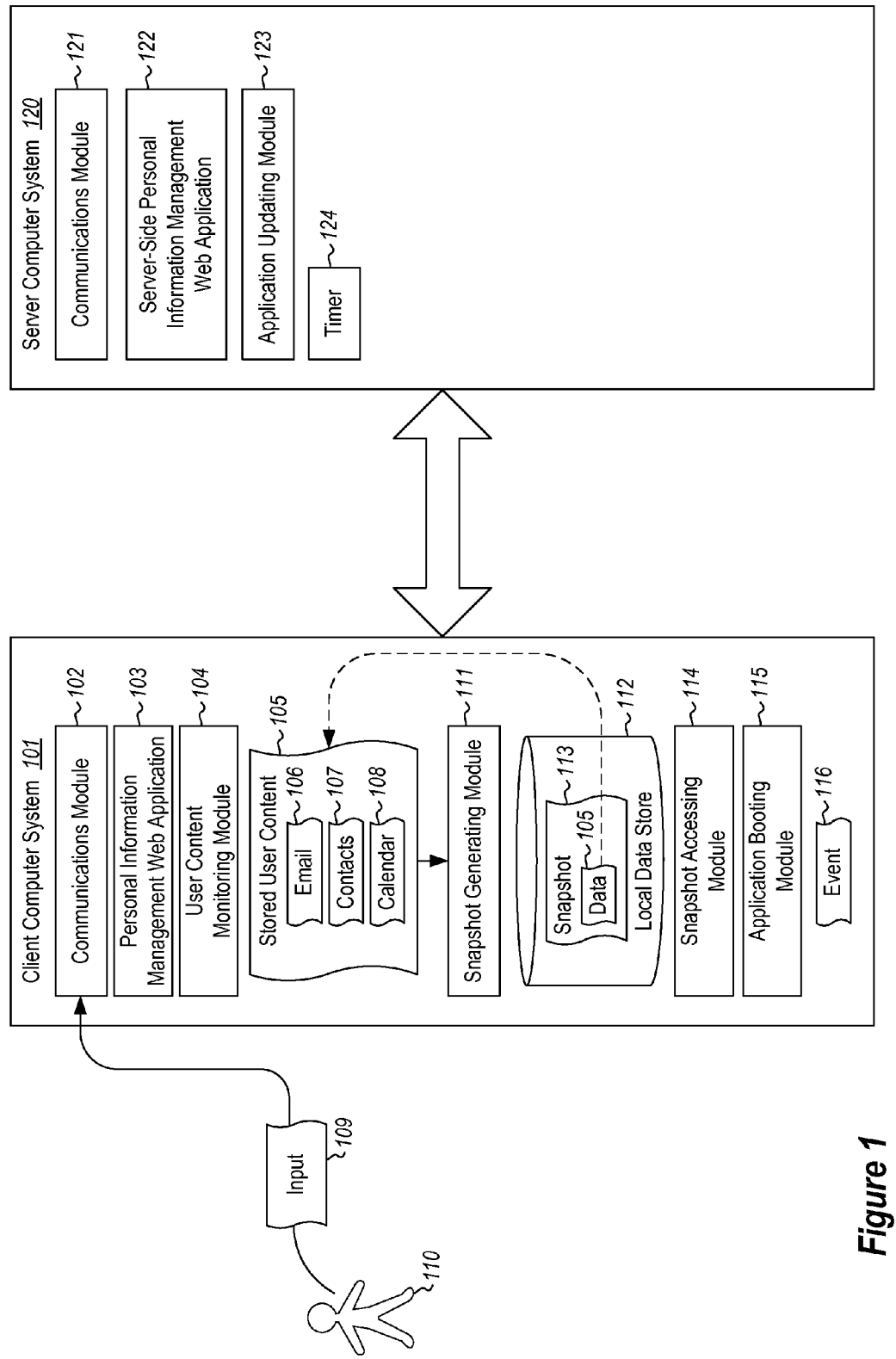
FIG. 1 illustrates a computer architecture in which embodiments described herein may operate including locally storing a snapshot of a personal information management web application.

Embodiments described herein are directed to locally storing a snapshot of a personal information management web application, efficiently booting a personal information management web application and to managing personal information management web application snapshots. In one embodiment, a client computer system determines that various portions of stored content for a personal information management web application have been changed. The client computer system creates a snapshot of certain, specified portions of data that are used for booting the personal information management web application and stores the created snapshot in local storage on the client computer system. As such, the snapshot is available for the next personal information management web application boot-up.

In another embodiment, a computer system determines that a snapshot was previously created for a personal information management web application, and is being stored in a local data store. The snapshot further includes various specified portions of data that are used for booting the personal information management web application. The computer system receives an indication that the personal information management web application is to be booted and accesses the snapshot for the personal information management web application stored in the local data store. The computer system then boots the personal information management web application using the accessed snapshot.

In yet another embodiment, a computer system determines that an event has occurred, where the occurrence of the event renders at least one existing personal information management web application snapshot invalid. The computer system determining that the invalid snapshot is not to be used during the next booting of the personal information management web application. The computer system then receives an indication that the personal information management web application is to be initiated and accesses web storage data to boot the personal information management web application in lieu of using the snapshot to boot the personal information management web application.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes client computer system 101 and server computer system 120. Computer systems 101 and 120 may be any type of local or distributed computer systems, including cloud computing systems. Each computer system includes modules for performing a variety of different functions. For instance, each computer system has a communications module (102 and 121, respectively). The communications module may communicate internally with other modules, or externally with other computer systems. The communication may be over wired, wireless or other types of communication networks. The client computer system 101 has a personal information management web application 103. This personal information management web application may allow user 110 to access email 106, contacts 107, calendar 108 and other information through a web browser. The web application 103 may be configured to run in substantially any type of web browser, on substantially any type of operating system. Using inputs 109, the user 110 can interact with and perform actions on his or her email, contacts or calendar.

The server computer system 120 also has its own version of the personal information management web application 122 that provides user data 105 including emails, contacts and calendar information to the user's application when the client's web application is online. The personal information management web application 103, however, may be operated in offline mode, where it does not have a connection to server 120. When the personal information management web application is put into the background (e.g. on a mobile device when another app is opened), the snapshot generating module 111 may generate a snapshot 113 that includes some or all of the user's data 105. The snapshot may be generated at various different times, including when the application goes into the background, when the application goes into offline mode, when certain changes are made, when certain events occur, or in other circumstances. The snapshot may be saved in a local data store 112. The local data store may be any type of data storage system, including various types of computer-readable media.

When the personal information management web application 103 is to be booted (e.g. user 110 touches the corresponding icon on his or her smart phone), the snapshot accessing module 114 may access the most recently stored snapshot (or another snapshot if so instructed) in the local data store 112. The application booting module 115 may then boot the accessed snapshot using application data stored in the local data store, along with the snapshot of the user's data 105. In this manner, the personal information management web application 103 can be booted on the client computer system 101 without any calls to the server 120 or the server-side personal information management web application 122. These concepts will be explained further below with regard to methods 200, 300 and 400 of FIGS. 2, 3 and 4, respectively.

Figure 2:
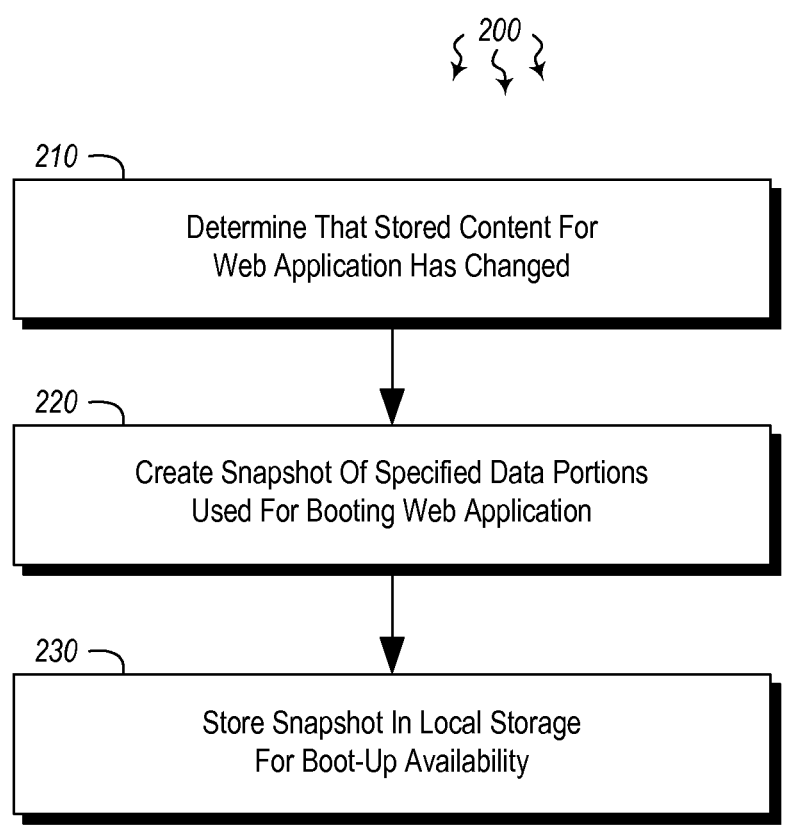
FIG. 2 illustrates a flowchart of an example method for locally storing a snapshot of a personal information management web application.
Figure 3:
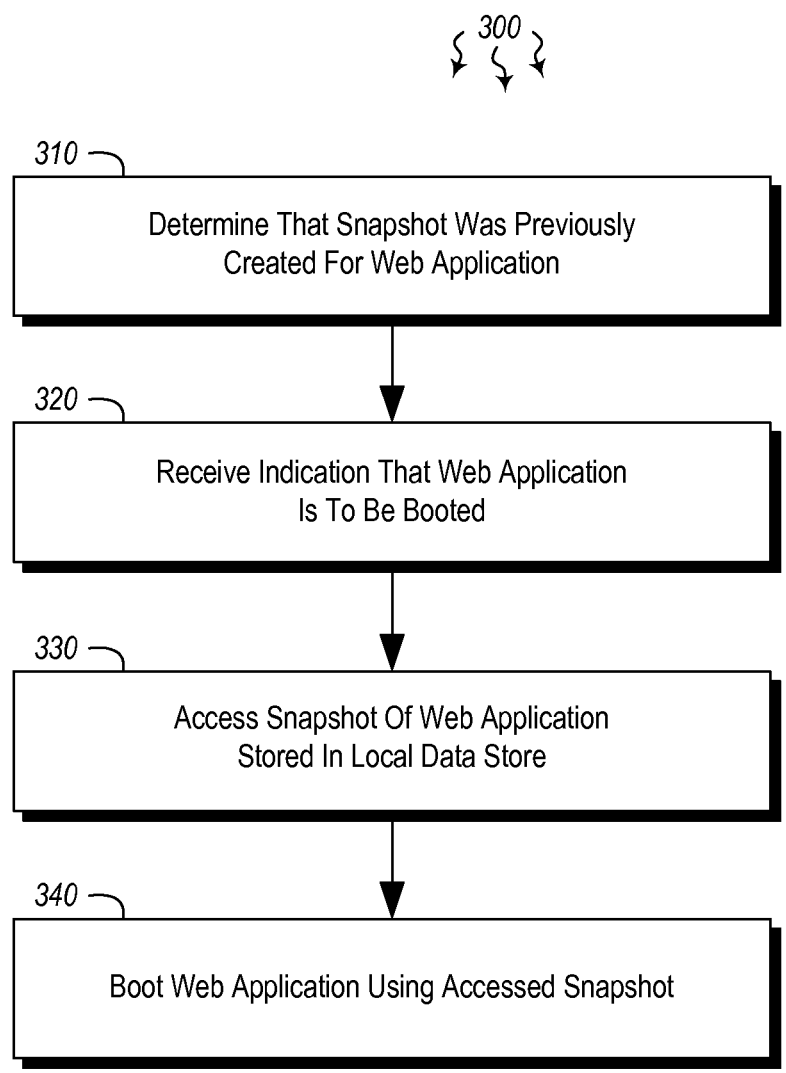
FIG. 3 illustrates a flowchart of an example method for efficiently booting a personal information management web application.
Figure 4:
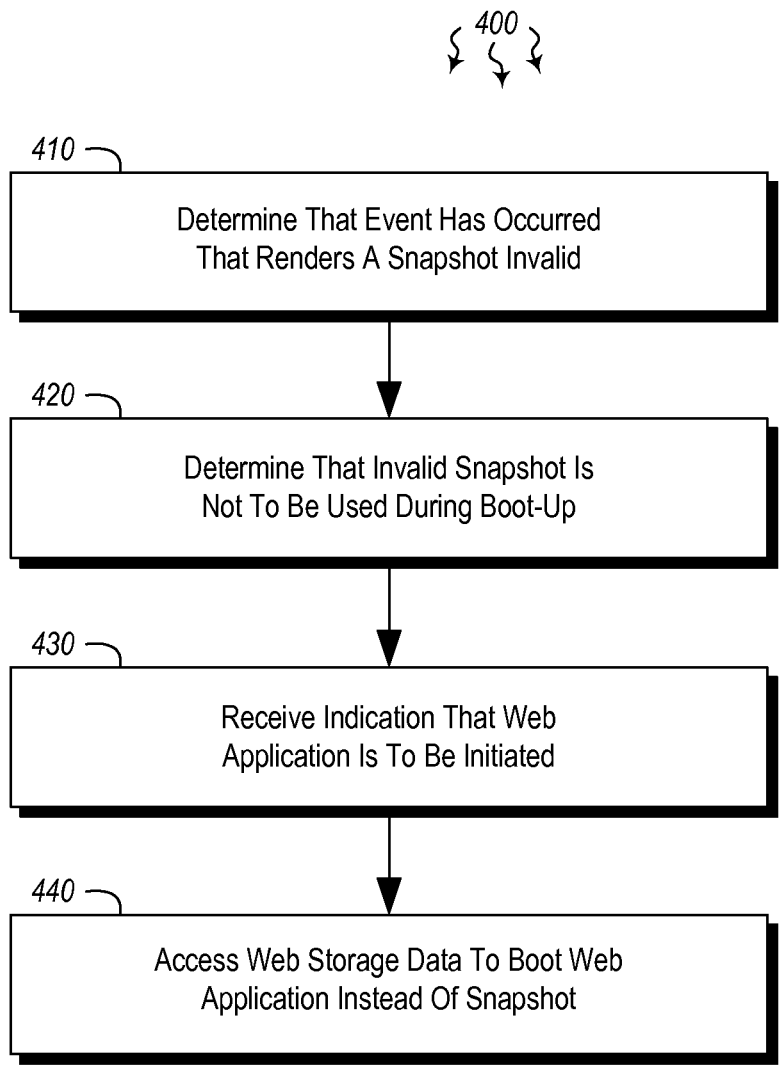
FIG. 4 illustrates a flowchart of an example method for managing personal information management web application snapshots.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 5:
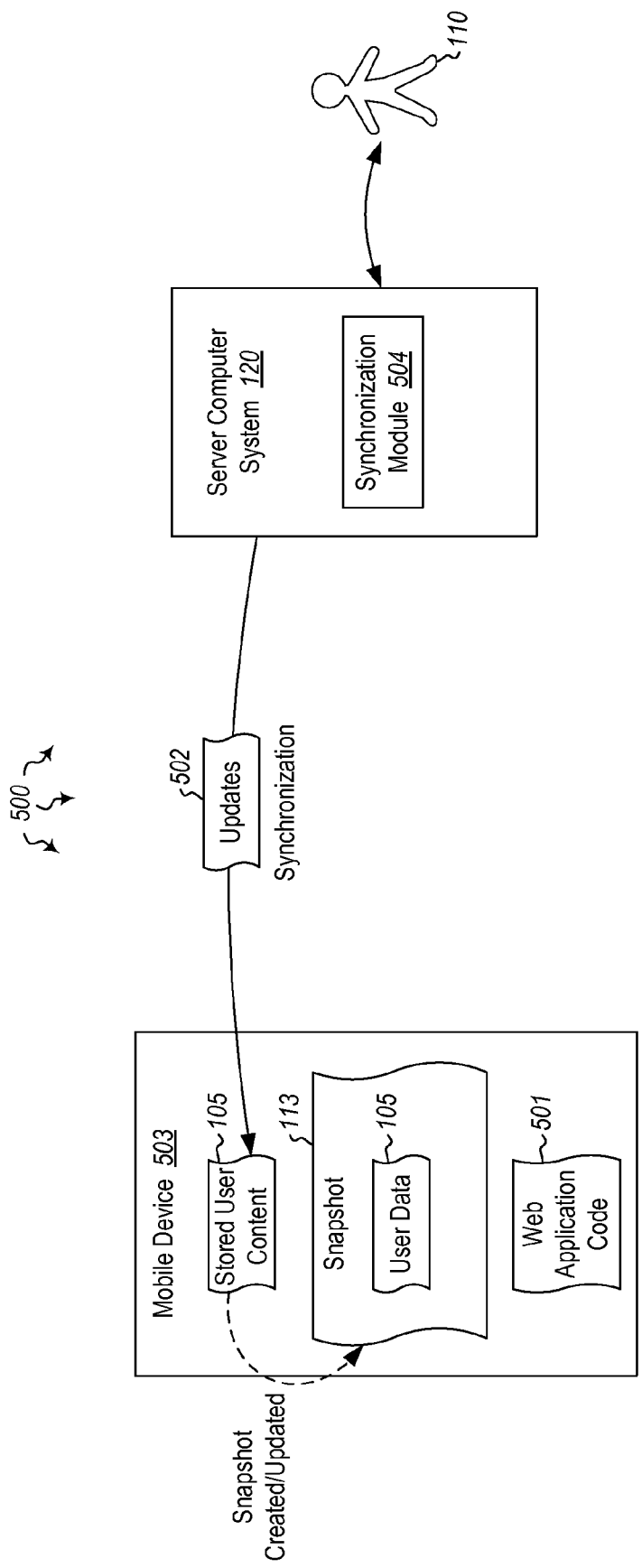
FIG. 5 illustrates an embodiment in which a snapshot is updated during a data synchronization.

FIG. 2 illustrates a flowchart of a method 200 for locally storing a snapshot of a personal information management web application. The method 200 will now be described with frequent reference to the components and data of environments 100 of FIGS. 1 and 500 of FIG. 5.

Method 200 includes an act of determining that one or more portions of stored content for a personal information management web application have been changed (act 210). The specified portions of data may include received emails, email folders, email content for at least one email message, and configuration data. Method 200 further includes an act of creating a snapshot of one or more specified portions of data that are used for booting the personal information management web application (act 220) and an act of storing the created snapshot in local storage on the client computer system to be available for the next personal information management web application boot-up (act 230). As such, the personal information management web application 103 can be booted without any calls to the application server 120.

As shown in FIG. 4, the snapshot 113 includes web application code 501 for the personal information management web application, as well as user data 105 for the user 110. In some cases, the user may be using a mobile device 503 or other computer system (e.g. a tablet, laptop or other mobile or stationary computer system). Because the web application code 501 and the user data are stored in the snapshot 113, the web application may be booted on the mobile device 503 without calls to a server (e.g. 120) (i.e. the application may be booted in offline mode). Additional data may also be stored in the snapshot 113, including previously received emails, email folders, email content for the received email messages, configuration data for the web application 113 including user settings, locale and other data. The data that is stored in the snapshot 113 and/or used to boot the personal information management web application may be determined by user 110, the provider of the personal information management web application, or some combination of thereof.

The snapshot 113 may be stored in a local data store 112. The local data store may be available to the computer system 101 substantially instantaneously. The snapshot 113 may be accessed in a synchronous manner, which allows the personal information management web application 103 to be loaded quickly from memory. In cases where the computer system 101 determines that existing snapshots are out-of-date (e.g. due to a new version of the personal information management web application being released on the server 120), the out-of-date snapshot of the personal information management web application is not used, and may be discarded.

FIG. 3 illustrates a flowchart of a method 300 for efficiently booting a personal information management web application. The method 300 will now be described with frequent reference to the components and data of environments 100 of FIGS. 1 and 500 of FIG. 5.

Method 300 includes an act of determining that a snapshot was previously created for a personal information management web application, the snapshot being stored in a local data store, and further including one or more specified portions of data that are used for booting the personal information management web application (act 310). Method 300 next includes an act of receiving an indication that the personal information management web application is to be booted (act 320). Furthermore, method 300 includes an act of accessing the snapshot for the personal information management web application stored in the local data store (act 330) and an act of booting the personal information management web application using the accessed snapshot (act 340).

Users may initiate the personal information management web application 103 using any conventional means of opening an application including selecting the application's icon on a touch screen or clicking the icon with a mouse. In some cases, as shown in FIG. 4, the computer system 101 may be a mobile computing device 503, where the user opens the personal information management web application using touch inputs (e.g. 109) or hardware buttons on the mobile device. As mentioned above, the personal information management web application may be booted from the snapshot in offline mode. In such cases, the web application data is updated when the mobile computing device returns to online mode. Upon returning to online mode, a data synchronization is initiated and updates 502 to the stored user content 105 are sent by the synchronization module 504 of the server computer system 120. These updates 502 are received by the computer system 101 (or the mobile device 503), and are then synced to the existing snapshot 113. Alternatively, in cases where a snapshot does not already exist, the updates 502 are used to create a new snapshot. It should also be noted that each snapshot is device-specific. As such, users may have different snapshots for each device associated with that user.

FIG. 4 illustrates a flowchart of a method 400 for managing personal information management web application snapshots. The method 400 will now be described with frequent reference to the components and data of environments 100 of FIGS. 1 and 500 of FIG. 5.

Method 400 includes an act of determining that an event has occurred, the occurrence of the event rendering at least one existing personal information management web application snapshot invalid (act 410) and an act of determining that the invalid snapshot is not to be used during the next booting of the personal information management web application (act 420). Next, method 400 includes an act of receiving an indication that the personal information management web application is to be initiated (act 430) and an act of accessing one or more portions of web storage data to boot the personal information management web application in lieu of using the snapshot to boot the personal information management web application (act 440).

In some cases, determining that an event 116 has occurred includes determining that the server 120 to which the personal information management web application 103 is connected is running a newer version of the personal information management web application (e.g. web application 122 is running version V+1). In such cases, the personal information management web application is updated to the version running on the server 120. Then, once the personal information management web application 103 has been updated, the snapshot generating module 111 may create a new snapshot 113. The new snapshot may include one or more specified portions of user data 105, as well as web application code 501 (and potentially other files) that are used for booting the personal information management web application. Then, using the data 105 in the snapshot, including the associated web application code 501, the application booting module 115 boots the web application 103 using the newly created snapshot.

Other events that may trigger the creation of a snapshot include determining that a threshold number of changes have occurred on the personal information management web application running on the server (i.e. application 122). In such cases, if the previously set threshold number of changes has occurred, the snapshot generating module 111 will generate a new snapshot. Similarly, if the computer system 101 determines that a threshold amount of time has elapsed since a snapshot was created for the personal information management web application (according to timer 124), a new snapshot will be generated. Still further, if computer system 101 determines that the personal information management web application 103 has gone into a background state, a new snapshot may be generated. Alternatively, in situations where a new snapshot is to be generated, any existing snapshots may be updated with the applicable changes.

It should be noted that many other events may trigger the creation or updating of a snapshot. As such, the above list should not be read as limiting. It should also be noted that a device-specific mode may be provided with different snapshots for each device associated with a user (e.g. in cases where a user has a phone and a tablet or other devices). Thus, the each snapshot may include device-specific files and/or settings that apply specifically to that device. Still further, if an existing snapshot cannot be updated (for whatever reason), a new snapshot can be taken in its place. The previously created snapshot(s) can then be removed from the local data store 112 and/or other local memory.

Accordingly, methods, systems and computer program products are provided which locally store a snapshot of a personal information management web application. The snapshots are stored in a local data store that is synchronously accessed, making the snapshot data available substantially immediately. Moreover, methods, systems and computer program products are provided which efficiently boot a personal information management web application and further provide means to manage personal information management web application snapshots.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. A computer system comprising the following:
one or more processors;
system memory;
one or more computer-readable storage media having stored thereon computer-executable instructions that are executable by the one or more processors to cause the computing system to perform the following:
create a snapshot of one or more specified portions of data that are used for booting a personal information management web application, the snapshot including both user data and web application code for the personal information management web application and such that the snapshot is configured for enabling loading of the personal information management web application in an offline mode;
store the created snapshot in local storage on the computer system to be available for a next personal information management web application boot-up in an offline mode;
determine an event has occurred comprising at least that a server connected to the computer system is running a different version of the personal information management web application; and
in response to determining the event has occurred, receive information from the server operable to update a version of the personal information management web application on the computer system to a different version of the personal information management web application on the server, and further in response to determining the event has occurred to create and store a new snapshot for the personal information management web application in the local storage which is used for the next personal information management web application boot-up, the new snapshot including both new snapshot user data and new snapshot web application code for the personal information management web application and such that new snapshot is configured for enabling loading of the personal information management web application in an offline mode.

2. The computer system of claim 1, wherein the specified portions of data comprise at least one of received emails, email folders, email content for at least one email message, and configuration data.

3. The computer system of claim 1, wherein the specified portions of data comprise both personal information management web application code and one or more portions of user data.

4. The computer system of claim 1, wherein the specified portions of data that are used for booting the personal information management web application are specified by at least one of a personal information management web application user and the personal information management web application.

5. The computer system of claim 1, wherein the snapshot stored in local storage is accessed synchronously by the client computer system.

6. The computer system of claim 1, wherein determining the event has occurred includes determining, at the server connected to the computer system, that the threshold amount of time has passed, the threshold amount of time comprising a threshold amount of time since a snapshot was created for the personal information management web application.

7. The computer system of claim 6, wherein determining that the threshold amount of time has elapsed is carried out using a timer at the server.

8. The computer system of claim 1, wherein determining the event has occurred includes determining the threshold number of changes have been made to the personal information management web application.

9. A computer system comprising the following:
one or more processors;
system memory;
one or more computer-readable storage media having stored thereon computer-executable instructions that are executable by the one or more processors to cause the computing system to:
determine that a snapshot was previously created for a personal information management web application, the snapshot being stored in a local data store and including both user data and web application code for the personal information management web application, such that the snapshot is configured for enabling loading of the personal information management web application in an offline mode by the computer system;
receive an indication that the personal information management web application is to be booted;
determine an event has occurred comprising at least that a server connected to the computer system is running a different version of the personal information management web application;
in response to determining the event has occurred, create a new snapshot for the personal information management web application, the new snapshot being stored in the local data store and including both new snapshot user data and new snapshot web application code for the personal information management web application and such that the new snapshot is configured for enabling loading of the personal information management web application in a offline mode; and
boot the personal information management web application using the new snapshot.

10. The computer system of claim 9, wherein receiving the indication that the personal information management web application is to be booted comprises receiving an input from a mobile device user indicating that the personal information management web application is to be brought into foreground mode.

11. The computer system of claim 9, wherein the personal information management web application is booted from the snapshot in offline mode.

12. The computer system of claim 11, wherein personal information management web application data is updated upon the personal information management web application returning to online mode.

13. The computer system of claim 9, wherein the snapshot is device-specific, such that users have different snapshots for each device associated with the user.

14. A computer system comprising the following:
one or more processors;
system memory;
one or more computer-readable storage media having stored thereon computer-executable instructions that are executable by the one or more processors to cause the computing system to:
  determine whether an event has occurred, wherein the event comprises a threshold amount of time has passed or a threshold number of changes have been made to a personal information management web application running on a server;
  render at least one existing personal information management web application snapshot invalid on the computer system in response to a determination that the event has occurred;
  determine that the invalid snapshot is not to be used by the computer system during a next booting of the personal information management web application when it is determined that the event has occurred;
  receive an indication that the personal information management web application is to be initiated;
  access one or more portions of web storage data from a server to perform a next boot of the personal information management web application in lieu of using the snapshot in the computer system to perform the next boot of the personal information management web application in response to a determination that the event has occurred; and
  use the snapshot to perform the next boot of the personal information management web application in response to a determination that the event has not occurred without accessing the server for the one or more portions of the web storage data to perform the next boot of the personal information management web application, and such that the computing system is caused to deterministically perform the next boot of the personal information management web application, based on the determination of whether the event has occurred, by accessing the server for web storage data to perform the boot when the determination is made that the event has occurred or, alternatively, by refraining from accessing the server for the one or more portions of the web storage data when the determination is made that the event has occurred.

15. The computer system of claim 14, wherein accessing one or more portions of the web storage data to boot the personal information management web application includes:
  an act of updating the personal information management web application to the version running on the server;
  an act of creating a new snapshot including one or more specified portions of data that are used for booting the personal information management web application, the new snapshot including both user data and web application code for the personal information management web application, such that the snapshot is configured for enabling loading of the personal information management web application in an offline mode by the computer system; and
  an act of booting from the newly created snapshot.

16. The computer system of claim 14, wherein the event further includes determining that a threshold number of changes have occurred on the personal information management web application running on the server; and
  wherein accessing one or more portions of the web storage data to boot the personal information management web application includes:
    an act of creating a new snapshot including one or more specified portions of data that are used for booting the personal information management web application; and
    an act of booting from the newly created snapshot.

17. The computer system of claim 14, wherein the event further includes determining that a threshold amount of time has elapsed; and
  wherein accessing one or more portions of the web storage data to boot the personal information management web application includes:
    an act of creating a new snapshot including one or more specified portions of data that are used for booting the personal information management web application; and
    an act of booting from the newly created snapshot.

18. The computer system of claim 14, wherein the event further includes determining that the personal information management web application has gone into a background state; and
  wherein accessing one or more portions of the web storage data to boot the personal information management web application includes:
    an act of creating a new snapshot including one or more specified portions of data that are used for booting the personal information management web application; and
    an act of booting from the newly created snapshot.

19. The computer system of claim 14, wherein the computer-executable instructions are further executable to cause the computer system to remove the invalid snapshot from memory.

* * * * *